(12) United States Patent
Reed

(10) Patent No.: US 9,245,308 B2
(45) Date of Patent: *Jan. 26, 2016

(54) ENCODING IN TWO CHROMINANCE DIRECTIONS

(71) Applicant: Digimarc Corporation, Beaverton, OR (US)

(72) Inventor: Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,617

(22) Filed: Feb. 25, 2014

(65) Prior Publication Data

US 2014/0334663 A1    Nov. 13, 2014

Related U.S. Application Data

(63) Continuation of application No. 13/494,849, filed on Jun. 12, 2012, now Pat. No. 8,660,298, which is a continuation of application No. 12/634,505, filed on Dec. 9, 2009, now Pat. No. 8,199,969, which is a continuation-in-part of application No. 12/337,029, filed on Dec. 17, 2008.

(51) Int. Cl.
  *G06K 9/00*   (2006.01)
  *G06T 1/00*   (2006.01)
  *H04N 9/68*   (2006.01)

(52) U.S. Cl.
  CPC .............. *G06T 1/0021* (2013.01); *H04N 9/68* (2013.01)

(58) Field of Classification Search
  CPC .................................. H04N 9/68; G06T 1/0021
  See application file for complete search history.

(56) References Cited

U.S. PATENT DOCUMENTS

| 4,504,084 A | 3/1985 | Jauch |
| 4,725,462 A | 2/1988 | Kimura |

(Continued)

FOREIGN PATENT DOCUMENTS

| DE | 2943436 | 5/1981 |
| EP | 590884 | 4/1994 |

(Continued)

OTHER PUBLICATIONS

U.S. Appl. No. 60/082,228, Rhoads, filed Apr. 16, 1998.

(Continued)

*Primary Examiner* — Shefali Goradia
(74) *Attorney, Agent, or Firm* — Digimarc Corporation

(57) ABSTRACT

The present disclosure relates generally to advanced digital signal processing including digital watermarking. One claim recites an apparatus comprising: memory for storing a color video signal or color image signal comprising first data representing a first chrominance direction and second data representing a second chrominance direction; and a processor programmed for: transforming the first data representing the first chrominance direction by encoding a first digital watermark component in the first data, the encoding a first digital watermark component in the first data utilizing a first encoding gain, and transforming the second data representing the second chrominance direction by encoding a second digital watermark component in the second data, the encoding a digital watermark signal in the second data utilizing a second encoding gain, wherein the second digital watermark component comprises an inverted signal relative to the first digital watermark component. Of course, other claims and combinations are disclosed.

15 Claims, 6 Drawing Sheets

(56) References Cited

U.S. PATENT DOCUMENTS

| | | | |
|---|---|---|---|
| 4,739,377 | A | 4/1988 | Allen |
| 4,926,247 | A * | 5/1990 | Nagasaki et al. ............ 348/262 |
| 5,051,835 | A | 9/1991 | Bruehl et al. |
| 5,093,147 | A | 3/1992 | Andrus et al. |
| 5,291,243 | A | 3/1994 | Heckman et al. |
| 5,337,361 | A | 8/1994 | Wang |
| 5,363,212 | A | 11/1994 | Taniuchi et al. |
| 5,385,371 | A | 1/1995 | Izawa |
| 5,481,377 | A | 1/1996 | Udagawa et al. |
| 5,502,576 | A | 3/1996 | Ramsay et al. |
| 5,530,751 | A | 6/1996 | Morris |
| 5,530,759 | A | 6/1996 | Braudaway et al. |
| 5,557,412 | A | 9/1996 | Saito et al. |
| 5,568,555 | A | 10/1996 | Shamir |
| 5,572,433 | A | 11/1996 | Falconer et al. |
| 5,617,119 | A | 4/1997 | Briggs et al. |
| 5,621,810 | A | 4/1997 | Suzuki et al. |
| 5,636,874 | A | 6/1997 | Singer |
| 5,646,997 | A | 7/1997 | Barton |
| 5,652,626 | A | 7/1997 | Kawakami et al. |
| 5,659,628 | A | 8/1997 | Tachikawa et al. |
| 5,659,726 | A | 8/1997 | Sandford et al. |
| 5,661,574 | A | 8/1997 | Kawana |
| 5,687,236 | A | 11/1997 | Moskowitz et al. |
| 5,689,623 | A | 11/1997 | Pinard |
| 5,696,594 | A | 12/1997 | Saito et al. |
| 5,721,788 | A | 2/1998 | Powell et al. |
| 5,729,741 | A | 3/1998 | Liaguno et al. |
| 5,748,763 | A | 5/1998 | Rhoads |
| 5,760,386 | A | 6/1998 | Ward |
| 5,787,186 | A | 7/1998 | Schroeder |
| 5,788,285 | A | 8/1998 | Wicker |
| 5,790,693 | A | 8/1998 | Graves et al. |
| 5,790,703 | A | 8/1998 | Wang |
| 5,809,139 | A | 9/1998 | Girod et al. |
| 5,822,436 | A | 10/1998 | Rhoads |
| 5,825,892 | A | 10/1998 | Braudaway et al. |
| 5,832,186 | A | 11/1998 | Kawana |
| 5,838,814 | A | 11/1998 | Moore |
| 5,862,218 | A | 1/1999 | Steinberg |
| 5,862,260 | A | 1/1999 | Rhoads |
| 5,875,249 | A | 2/1999 | Mintzer et al. |
| 5,893,101 | A | 4/1999 | Balogh et al. |
| 5,905,800 | A | 5/1999 | Moskowitz et al. |
| 5,905,819 | A | 5/1999 | Daly |
| 5,915,027 | A | 6/1999 | Cox et al. |
| 5,919,730 | A | 7/1999 | Gasper et al. |
| 5,930,369 | A | 7/1999 | Cox et al. |
| 5,933,798 | A | 8/1999 | Linnartz |
| 5,946,414 | A | 8/1999 | Cass et al. |
| 5,951,055 | A | 9/1999 | Mowry, Jr. |
| 5,960,081 | A | 9/1999 | Vynne et al. |
| 5,960,103 | A | 9/1999 | Graves et al. |
| 5,974,548 | A | 10/1999 | Adams |
| 5,978,013 | A | 11/1999 | Jones et al. |
| 5,991,426 | A | 11/1999 | Cox et al. |
| 6,045,656 | A | 4/2000 | Foster et al. |
| 6,046,808 | A | 4/2000 | Fateley |
| 6,054,021 | A | 4/2000 | Kurrle et al. |
| 6,081,827 | A | 6/2000 | Reber |
| 6,094,483 | A | 7/2000 | Fridrich et al. |
| 6,104,812 | A | 8/2000 | Koltai et al. |
| 6,122,403 | A | 9/2000 | Rhoads |
| 6,128,411 | A | 10/2000 | Knox |
| 6,136,752 | A | 10/2000 | Paz-Pujalt et al. |
| 6,185,312 | B1 | 2/2001 | Nakamura et al. |
| 6,185,683 | B1 | 2/2001 | Ginter et al. |
| 6,192,138 | B1 | 2/2001 | Yamadaji |
| 6,201,879 | B1 | 3/2001 | Bender et al. |
| 6,233,347 | B1 | 5/2001 | Chen et al. |
| 6,233,684 | B1 | 5/2001 | Stefik et al. |
| 6,234,537 | B1 | 5/2001 | Gutmann et al. |
| 6,246,777 | B1 | 6/2001 | Agarwal et al. |
| 6,272,176 | B1 | 8/2001 | Srinivasan |
| 6,272,248 | B1 | 8/2001 | Saitoh et al. |
| 6,272,634 | B1 | 8/2001 | Tewfik et al. |
| 6,278,792 | B1 | 8/2001 | Cox et al. |
| 6,281,165 | B1 | 8/2001 | Cranford |
| 6,285,776 | B1 | 9/2001 | Rhoads |
| 6,304,345 | B1 | 10/2001 | Patton et al. |
| 6,314,192 | B1 | 11/2001 | Chen et al. |
| 6,320,675 | B1 | 11/2001 | Sakaki et al. |
| 6,332,031 | B1 | 12/2001 | Rhoads et al. |
| 6,332,194 | B1 | 12/2001 | Bloom et al. |
| 6,334,187 | B1 | 12/2001 | Kadono |
| 6,356,363 | B1 | 3/2002 | Cooper et al. |
| 6,373,965 | B1 | 4/2002 | Liang |
| 6,390,362 | B1 | 5/2002 | Martin |
| 6,394,358 | B1 | 5/2002 | Thaxton et al. |
| 6,404,926 | B1 | 6/2002 | Miyahara et al. |
| 6,418,232 | B1 | 7/2002 | Nakano et al. |
| 6,427,020 | B1 * | 7/2002 | Rhoads ..................... 382/100 |
| 6,438,251 | B1 | 8/2002 | Yamaguchi |
| 6,456,726 | B1 | 9/2002 | Yu |
| 6,481,753 | B2 | 11/2002 | Van Boom et al. |
| 6,590,996 | B1 | 7/2003 | Reed et al. |
| 6,591,009 | B1 | 7/2003 | Usami et al. |
| 6,614,914 | B1 | 9/2003 | Rhoads et al. |
| 6,636,615 | B1 | 10/2003 | Rhoads et al. |
| 6,697,498 | B2 | 2/2004 | Kawaguchi et al. |
| 6,718,046 | B2 | 4/2004 | Reed et al. |
| 6,721,440 | B2 | 4/2004 | Reed et al. |
| 6,763,122 | B1 | 7/2004 | Rodriguez et al. |
| 6,763,123 | B2 | 7/2004 | Reed et al. |
| 6,804,377 | B2 | 10/2004 | Reed et al. |
| 6,891,959 | B2 | 5/2005 | Reed et al. |
| 6,912,295 | B2 | 6/2005 | Reed et al. |
| 6,950,532 | B1 | 9/2005 | Schumann |
| 6,972,793 | B1 | 12/2005 | Kameyama |
| 6,973,195 | B1 | 12/2005 | Matsui |
| 7,027,614 | B2 | 4/2006 | Reed |
| 7,142,689 | B2 | 11/2006 | Hayashi et al. |
| 7,280,669 | B2 | 10/2007 | Choi et al. |
| 7,369,677 | B2 | 5/2008 | Petrovic et al. |
| 7,391,880 | B2 | 6/2008 | Reed et al. |
| 7,443,537 | B2 | 10/2008 | Reed |
| 7,738,673 | B2 | 6/2010 | Reed |
| 7,961,904 | B2 | 6/2011 | Sugahara et al. |
| 8,027,509 | B2 | 9/2011 | Reed et al. |
| 8,094,869 | B2 | 1/2012 | Reed et al. |
| 8,199,969 | B2 | 6/2012 | Reed |
| 8,363,161 | B2 | 1/2013 | Pearlstein |
| 2001/0014169 | A1 | 8/2001 | Liang |
| 2001/0021144 | A1 | 9/2001 | Oshima et al. |
| 2001/0024510 | A1 | 9/2001 | Iwamura |
| 2001/0026377 | A1 | 10/2001 | Ikegami |
| 2001/0028727 | A1 | 10/2001 | Naito et al. |
| 2001/0030759 | A1 | 10/2001 | Hayashi et al. |
| 2001/0030761 | A1 | 10/2001 | Ideyama |
| 2001/0033674 | A1 | 10/2001 | Chen et al. |
| 2001/0037313 | A1 | 11/2001 | Lofgren et al. |
| 2001/0037455 | A1 | 11/2001 | Lawandy et al. |
| 2001/0040980 | A1 | 11/2001 | Yamaguchi |
| 2001/0052076 | A1 | 12/2001 | Kadono |
| 2001/0053235 | A1 | 12/2001 | Sato |
| 2001/0054644 | A1 | 12/2001 | Liang |
| 2002/0015509 | A1 | 2/2002 | Nakamura et al. |
| 2002/0018879 | A1 | 2/2002 | Barnhart et al. |
| 2002/0021824 | A1 | 2/2002 | Reed et al. |
| 2002/0023218 | A1 | 2/2002 | Lawandy et al. |
| 2002/0027612 | A1 | 3/2002 | Brill et al. |
| 2002/0027674 | A1 | 3/2002 | Tokunaga et al. |
| 2002/0031241 | A1 | 3/2002 | Kawaguchi et al. |
| 2002/0033844 | A1 | 3/2002 | Levy et al. |
| 2002/0040433 | A1 | 4/2002 | Kondo |
| 2002/0057238 | A1 | 5/2002 | Nitta et al. |
| 2002/0057431 | A1 | 5/2002 | Fateley et al. |
| 2002/0061121 | A1 | 5/2002 | Rhoads et al. |
| 2002/0061122 | A1 | 5/2002 | Fujihara |
| 2002/0062442 | A1 | 5/2002 | Kurahashi |
| 2002/0064298 | A1 | 5/2002 | Rhoads et al. |
| 2002/0067844 | A1 | 6/2002 | Reed et al. |
| 2002/0068987 | A1 | 6/2002 | Hars |
| 2002/0073317 | A1 | 6/2002 | Hars |

(56) References Cited

U.S. PATENT DOCUMENTS

| | | | |
|---|---|---|---|
| 2002/0080396 A1 | 6/2002 | Silverbrook et al. |
| 2002/0083123 A1 | 6/2002 | Freedman et al. |
| 2002/0094082 A1 | 7/2002 | Jones |
| 2002/0097873 A1 | 7/2002 | Petrovic |
| 2002/0099943 A1 | 7/2002 | Rodriguez et al. |
| 2002/0118394 A1 | 8/2002 | Mckinley et al. |
| 2002/0122568 A1 | 9/2002 | Zhao |
| 2002/0141310 A1 | 10/2002 | Stephany |
| 2002/0150246 A1 | 10/2002 | Ogino |
| 2002/0163633 A1 | 11/2002 | Cohen |
| 2002/0164051 A1 | 11/2002 | Reed et al. |
| 2002/0176600 A1 | 11/2002 | Rhoads et al. |
| 2003/0005304 A1 | 1/2003 | Lawandy et al. |
| 2003/0012562 A1 | 1/2003 | Lawandy et al. |
| 2003/0032033 A1 | 2/2003 | Anglin et al. |
| 2003/0056104 A1 | 3/2003 | Carr et al. |
| 2004/0125125 A1 | 7/2004 | Levy |
| 2004/0227854 A1 | 11/2004 | Withers et al. |
| 2005/0031159 A1 | 2/2005 | Rhoads |
| 2007/0196024 A1 | 8/2007 | Tian |
| 2010/0150396 A1 | 6/2010 | Reed |
| 2010/0150434 A1 | 6/2010 | Reed |

FOREIGN PATENT DOCUMENTS

| | | |
|---|---|---|
| EP | 642060 | 5/1995 |
| EP | 705022 | 4/1996 |
| EP | 991047 | 4/2000 |
| EP | 1077570 | 2/2001 |
| EP | 1137244 | 9/2001 |
| EP | 1152592 | 11/2001 |
| EP | 1173001 | 1/2002 |
| EP | 1209897 | 5/2002 |
| GB | 1534403 | 12/1978 |
| GB | 2360659 | 9/2001 |
| JP | 07093567 | 4/1995 |
| JP | 07108786 | 4/1995 |
| WO | WO95/13597 | 5/1995 |
| WO | WO96/03286 | 2/1996 |
| WO | WO 96/36163 | 11/1996 |
| WO | WO 99/10837 | 3/1999 |
| WO | WO 00/16546 | 3/2000 |
| WO | WO01/05075 | 1/2001 |
| WO | WO01/08405 | 2/2001 |
| WO | WO01/39121 | 5/2001 |
| WO | WO01/72030 | 9/2001 |
| WO | WO01/73997 | 10/2001 |
| WO | WO01/88883 | 11/2001 |
| WO | WO01/97128 | 12/2001 |
| WO | WO01/97175 | 12/2001 |
| WO | WO02/19269 | 3/2002 |
| WO | WO02/21846 | 3/2002 |
| WO | WO02/23481 | 3/2002 |

OTHER PUBLICATIONS

U.S. Appl. No. 09/465,418, Rhoads et al., filed Dec. 16, 1999.
U.S. Appl. No. 09/562,516, Rodriguez et al., filed May 1, 2000.
U.S. Appl. No. 09/619,264, Kumar, filed Jul. 19, 2000.
U.S. Appl. No. 60/323,148, Davis et al., filed Sep. 17, 2001.
Nov. 8, 2011 Office Action; and Oct. 13, 2011 Amendment Accompanying Request for Continued Examination; all from U.S. Appl. No. 10/602,549.
Nov. 16, 2011 Office Action from U.S. Appl. No. 12/337,029.
Apr. 11, 2012 Notice of Allowance; Apr. 3, 2012 Amendment; and Mar. 13, 2012 Non-final Office Action; all from U.S. Appl. No. 12/634,505.
Alattar, "Smart Images Using Digimarc's Watermarking Technology," IS&T/SPIE's 12.sup.th Int. Symposium on Electronic Imaging, San Jose, CA, Jan. 25, 2000, vol. 3971, No. 25, 10 pages.
Battialo et al., "Robust Watermarking for Images Based on Color Manipulation," IH/99 LNCS 1768, pp. 302-317, 2000.
Bender et al., "Applications for Data Hiding," IBM Systems Journal, vol. 39, Nos. 3&4, 2000, pp. 547-568.
Bors et al., "Image Watermarking Using DCT Domain Contraints," Proc. Int. Conf. on Image Processing, vol. 3, pp. 231-234, 1996.
Brownell, "Counterfeiters Dye Over Security Measures," SPIE's OE Magazine, Sep. 2001, pp. 8-9.
Frequently Asked Questions About Digimarcs Signature Technology, Aug. 1, 1995, http://www.digimarc.com, 9 pages.
"Holographic signatures for digital images," The Seybold Report on Desktop Publishing, Aug. 1995, one page.
Hunt, "The Reproduction of Colour in Photography, Printing & Television," 1987, pp. 588-589 and Plate 35 (in color).
Kohda et al., "Watermarking Through CDMA Channels Using Spread Spectrum Techniques," 2000 IEEE, pp. 671-674.
Komatsu et al., "A Proposal on Digital Watermark in Document image Communication and Its Application to Realizing a Signature," Electronics and Communications in Japan, Part 1, vol. 1990, pp. 22-33.
Komatsu et al., "Authentication System Using Concealed Image in Telematics," Memoirs of the School of Science & Engineering, Waseda Univ., No. 52, 1988, pp. 45-60.
Kutter et al., "Digital Signature of Color Images Using Amplitude Modulation," SPIE vol. 3022, 1997, pp. 518-526.
ORuanaidh et al, "Watermarking Digital Images for Copyright Protection," http://www.kalman.mee.tcd.ie/people/jjr/eva.sub.--pap.htm, Feb. 2, 1996, 8 pages.
Piva et al., "Exploiting the Cross-Correlation of RGB-Channels for Robust Watermarking of Color Images," 1999 IEEE, pp. 306-310.
Tsang et al. "Robust and High Quality Video Watermarking with the use of Temporal Redundancy," in Security and Watermarking of Multimedia Contents III, Ping Wah Wong, Edward J. Delp III, Editors, Proceedings of SPIE vol. 4314, pp. 55-63, 2001.
Vidal et al., "Non-Noticeable Information Embedding in Color Images: Marking and Detection," IEEE (1999), pp. 293-297.
Voyatzis et al., "Embedding Robust Watermarks by Chaotic Mixing," Digital Signal Processing Proceedings, IEEE Jul. 1977, pp. 213-216, vol. 1.
Fleet et al., "Embedding Invisible Information in Color Images," Proc. Int. Conf. on Image Processing, vol. 1, pp. 532-535, Oct. 1997.
Wang et al., "Embedding Digital Watermarks in Halftone Screens," Security and Watermarking of Multimedia Contents II, Proc. of SPIE vol. 3971 (2000), pp. 218-227.
Jul. 15, 2015 Amendment After Notice of Allowance and Statement regarding Reasons for Allowance; Apr. 15, 2015 Notice of Allowance; Mar. 19, 2015 Amendment Accompanying RCE; Feb. 20, 2014 Final Office Action; Jan. 17, 2014 Amendment; Jul. 17, 2014 Non-final Office Action; Jul. 5, 2013 Amendment accompanying RCE; Jun. 5, 2012 Final Office Action; all from applicant's U.S. Appl. No. 12/337,029 (published as US 2010-0150434 A1).

* cited by examiner

ENCODING IN TWO CHROMINANCE DIRECTIONS

RELATED APPLICATION DATA

This application is a continuation of U.S. patent application Ser. No. 13/494,849, filed Jun. 12, 2012 (now U.S. Pat. No. 8,660,298), which is a continuation of U.S. patent application Ser. No. 12/634,505, filed Dec. 9, 2009 (now U.S. Pat. No. 8,199,969), which is a continuation-in-part of U.S. patent application Ser. No. 12/337,029, filed Dec. 17, 2008 (published as US 2010-0150434 A1). The above patent documents are each hereby incorporated herein by reference in its entirety.

TECHNICAL FIELD

The present invention relates generally to steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

One possible combination of the disclosed technology is a method including: receiving a color image or video; transforming the color image or video signal by separating the color image or video into at least first data representing a first color channel of the color image or video and second data representing a second color channel of the color image or video, where the first data comprises a digital watermark signal embedded therein and the second data comprises the digital watermark signal embedded therein with a signal polarity that is inversely related to the polarity of the digital watermark signal in the first data; subtracting the second data from the first data to yield third data; using at least a processor or electronic processing circuitry, analyzing the third data to detect the digital watermark signal; once detected, providing information associated with the digital watermark signal.

Another combination is a method including: obtaining first data representing a first chrominance channel of a color image or video, where the first data comprises a watermark signal embedded therein; obtaining second data representing a second chrominance channel of the color image or video, the second data comprising the watermark signal embedded therein but with a signal polarity that is inversely related to the polarity of the watermark signal in the first data; combining the second data with the first data in manner that reduces image or video interference relative to the watermark signal, said act of combining yielding third data; using at least a processor or electronic processing circuitry, processing the third data to obtain the watermark signal; once obtained, providing information associated with the watermark signal.

Still another combination is an apparatus comprising: a processor or electronic processing circuitry to control: (a) handling of first data representing a first color channel of a color image or video, where the first data comprises a watermark signal embedded therein; (b) handling of second data representing a second color channel of the color image or video, the second data comprising the watermark signal embedded therein but with a signal polarity that is inversely related to the polarity of the watermark signal in the first data; (c) combining the second data with the first data in manner that reduces image or video interference relative to the watermark signal, the combining yielding third data; (d) processing the third data to obtain the watermark signal; and (e) once obtained, providing information associated with the watermark signal.

Yet another possible combination is a method including: a method including: obtaining first data representing a first chrominance channel of a color image or video signal; obtaining second data representing a second chrominance channel of the color image or video signal; using a processor or electronic processing circuitry, embedding a watermark signal in the first data with a first signal polarity; using a processor or electronic processing circuitry, transforming the second data by embedding the watermark signal in the second data so that when embedded in the second data the watermark signal comprises a second signal polarity that is inversely related to the first signal polarity of the watermark signal in the first data; combining the watermarked first data and the watermarked second data to yield a watermarked version of the color image or video signal, whereby during detection of the watermark signal from the watermarked version of the color image or video signal, the second data is combined with the first data in a manner that reduces image or video signal interference relative to the watermark signal.

Further combinations, aspects, features and advantages will become even more apparent with reference to the following detailed description and accompanying drawing.

DETAILED DESCRIPTION

The following disclosure discusses a digital watermarking technique that utilizes at least two chrominance channels (also called "color planes," "color channels" and/or "color direction"). Chrominance is generally understood to include information, data or signals representing color components of an image or video. In contrast to a color image or video, a grayscale (monochrome) image or video has a chrominance value of zero.

Figure 1:
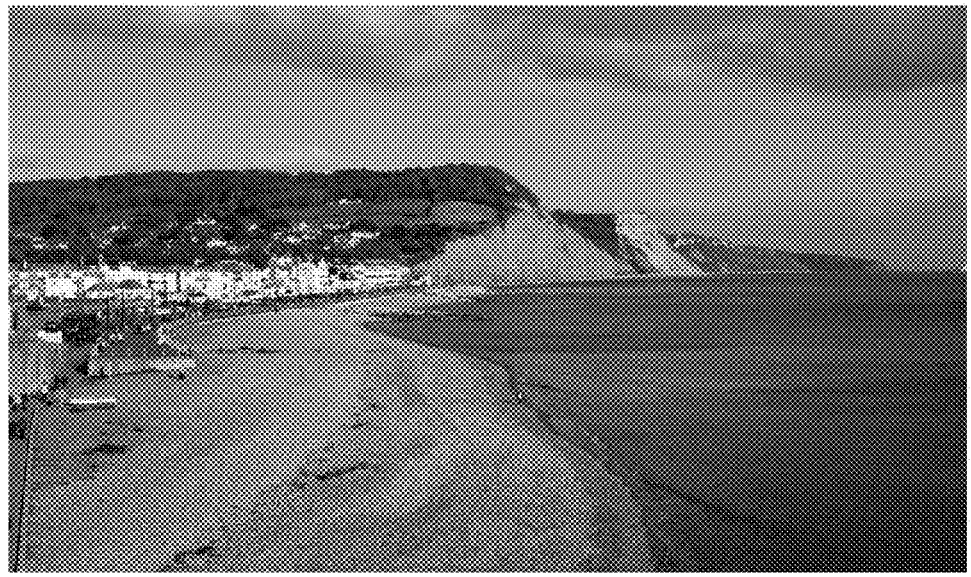
FIG. 1 represents a color image.
Figure 2:
FIG. 2 represents a first color channel ('a' channel) of the color image representation shown in FIG. 1.
Figure 3:
FIG. 3 represents a second color channel ('b' channel) of the color image representation shown in FIG. 1.

Media content that includes a color image (or color video) is represented in FIG. 1. An industry standard luminance and chrominance color space is called "Lab" (for Lightness (or luminance), plus 'a' and 'b' color channels) that can be used to separate components of images and video. FIG. 2 is an 'a' channel representation of FIG. 1 (shown in grayscale), and FIG. 3 is a 'b' channel representation of FIG. 1 (shown in grayscale). Of course, our inventive methods and apparatus will apply to and work with other color schemes and techniques as well. For example, alternative luminance and chrominance color schemes include "Yuv" (Y=luma, and 'u' and 'v' represent chrominance channels) and "Ycc." (also a dual chrominance space representation).

Figure 4:
FIG. 4 is a representation of the sum of the first color channel of FIG. 2 and the second color channel of FIG. 3 (e.g., a+b).
Figure 5:
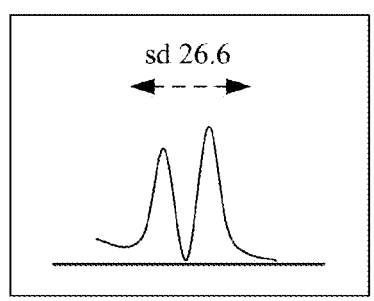
FIG. 5 is a graph showing a histogram standard deviation of FIG. 4.
Figure 6:
FIG. 6 is a representation of the difference between the first color channel of FIG. 2 and the second color channel of FIG. 3 (a−b).
Figure 7:
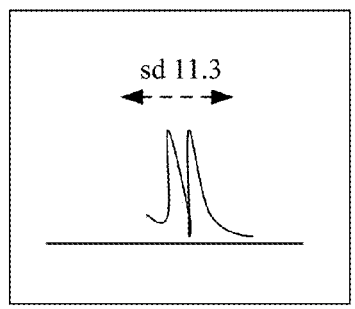
FIG. 7 is a graph showing a histogram standard deviation of FIG. 6.

Let's first discuss the additive and subtractive effects on FIGS. 2 and 3. FIG. 4 illustrates a representation of the result of adding the 'a' channel (FIG. 2) with the 'b' channel (FIG. 3). FIG. 6 illustrates a representation of the result of subtracting the 'b' channel (FIG. 3) from the 'a' channel (FIG. 2). The result of subtracting the 'b' channel from the 'a' channel yields reduced image content relative to adding the two channels since the 'a' and 'b' color planes have correlated image data in the Lab scheme. (In typical natural imagery, the 'a' and 'b' chrominance channels tend to be correlated. That is to say where 'a' increases, 'b' also tends to increase. One measure of this is to measure the histogram of the two chrominance planes when they are added (see FIG. 5), and compare that to the histogram when the two color planes are subtracted (see FIG. 7). The fact that the standard deviation of FIG. 7 is about half that of FIG. 5 also supports this conclusion, and illustrates the reduction in image content when 'b' is subtracted from 'a') In this regard, FIG. 4 provides enhanced or emphasized image content due to the correlation. Said another way, the subtraction of the FIG. 3 image from FIG. 2 image provides less image interference or reduces image content. The histogram representations of FIG. 4 and FIG. 6 (shown in FIGS. 5 and 7, respectively) further support this conclusion.

Now let's consider watermarking in the context of FIGS. 2 and 3.

In a case where a media signal includes (or may be broken into) at least two chrominance channels, a watermark embedder may insert digital watermarking in both the 'a' color direction (FIG. 2) and 'b' color direction (FIG. 3). This embedding can be preformed in parallel (if using two or more encoders) or serial (if using one encoder). The watermark embedder may vary the gain (or signal strength) of the watermark signal in the 'a' and 'b' channel to achieve improved hiding of the watermark signal. For example, the 'a' channel may have a watermark signal embedded with signal strength that greater or less than the watermark signal in the 'b' channel. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equations 1 and 2.

$$WMa = a(\text{channel}) + wm \qquad (1)$$

$$WMb = b(\text{channel}) - wm \qquad (2)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained (from optical scan data, memory, transmission channel, etc.), and data representing the color image is communicated to a watermark detector for analysis. The detector (or a process, processor or electronic processing circuitry used in conjunction with the detector) subtracts WMb from WMa resulting in WMres as shown below:

$$WMres = WMa - WMb \qquad (3)$$

$$WMres = (a+wm) - (b-wm) \qquad (4)$$

$$WMres = (a-b) + 2*wm \qquad (5)$$

This subtraction operation yields reduced image content (e.g., FIG. 6) as discussed above. The subtraction or inverting operation of the color channels also emphasizes or increases the watermark signal (2*wm), producing a stronger watermark signal for watermark detection. Indeed, subtracting the color channels increases the watermark signal-to-media content ratio: WMres=(a−b)+2*wm.

Figure 8:
FIG. 8 is an image representation of the difference between the first color channel of FIG. 2 (including a watermark signal embedded therein) and the second color channel of FIG. 3 (including the watermark signal embedded therein).
Figure 9:
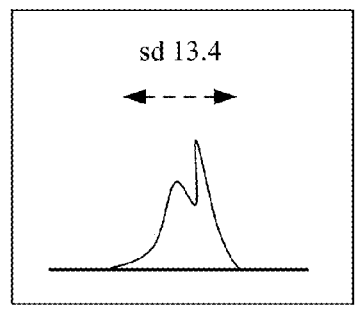
FIG. 9 is a graph showing a histogram standard deviation of FIG. 8.

FIG. 8 illustrates the result of equation 5 (with respect to watermarked versions of FIG. 2 and FIG. 3). As shown, the perceptual "graininess" or "noise" in the image corresponds to the emphasized watermark signal. The image content is also reduced in FIG. 8. A histogram representation of FIG. 8 is shown in FIG. 9 and illustrates a favorable reduction of image content.

A watermark detector may extract or utilize characteristics associated with a synchronization signal (if present) from a frequency domain representation of WMres. The detector may then use this synchronization signal to resolve scale, orientation, and origin of the watermark signal. The detector may then detect the watermark signal and obtain any message or payload carried thereby.

To even further illustrate the effects of improving the watermark signal-to-media content ratio with our inventive processes and systems, we provide some additive and subtractive examples in the content of watermarking.

For the following example, a watermark signal with the same polarity is embedded in each of the 'a' color channel and the 'b' color channel. The same signal polarity is represented by a plus ("+") sign in equations 6 and 7.

$$WMa = a + wm \quad (6)$$

$$WMb = b + wm \quad (7)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained, and data representing the color image is communicated to a watermarked detector for analysis. The detector (or a process, processor, or electronic processing circuitry used in conjunction with the detector) adds the 'a' and 'b' color channels to one another (resulting in WMres) as shown below:

$$WMres = WMa + WMb \quad (8)$$

$$WMres = (a + wm) + (b + wm) \quad (9)$$

$$WMres = (a + b) + 2*wm \quad (10)$$

This addition operation results in increased image content (e.g., FIG. 4). Indeed, image interference during watermark detection will be greater since the two correlated 'a' and 'b' color channels tend to reinforce each other.

By way of further example, if WMb is subtracted from WMa (with watermark signals having the same polarity), the following results:

$$WMres = WMa - WMb \quad (11)$$

$$WMres = (a + wm) - (b + wm) \quad (12)$$

$$WMres = (a - b) + \approx 0*wm \quad (13)$$

A subtraction or inverting operation in a case where a watermark signal includes the same polarity decreases image content (e.g., FIG. 4), but also significantly decreases the watermark signal. This may result in poor—if any—watermark detection.

Figure 10A:
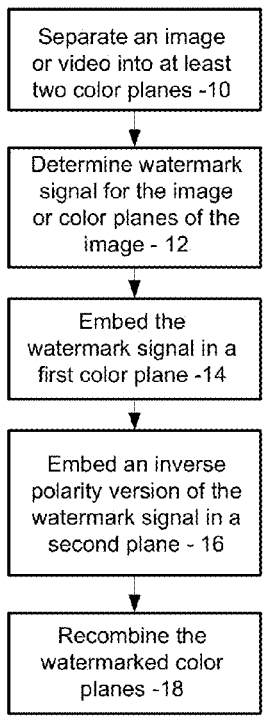
FIGS. 10a and 10b are block diagrams showing, respectively, an embedding process and a detection process.
Figure 10B:
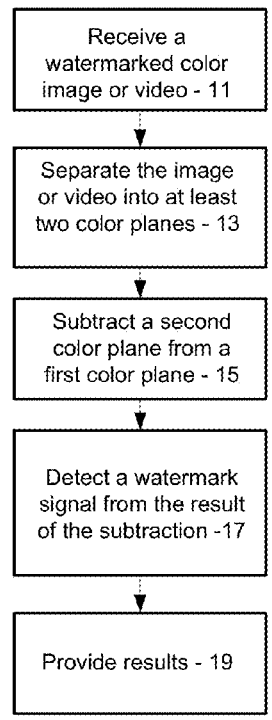

FIGS. 10a and 10b are flow diagrams illustrating some related processes and methods. These processes may be carried out, e.g., via a computer processor, electronic processing circuitry, printer, handheld device such as a smart cell phone, etc.

With reference to FIG. 10a, a color image (or video) is obtained and separated into at least two (2) color channels or planes (10). A watermark signal is determined for the color image or video (12). Of course, the watermark signal for the color image or video may be determined prior to or after color plane separation. The determined watermark signal is embedded in a first of the color planes (14). An inverse polarity version of the watermark signal is embedded in a second color plane. The color planes are recombined (perhaps with data representing luminance) to form a composite color image.

With reference to FIG. 10b, a watermarked color image or video is obtained or received (11). The color image (or video) has or can be separated into at least two (2) color planes or channels (13). A first color plane includes a watermark signal embedded therein. A second color plane includes the watermark signal embedded therein with a polarity that is inversely related to the watermark signal in the first color plane. The watermarked second color plane is subtracted from the watermarked first color (15). The result of the subtraction is analyzed to detect the watermark signal. A detected watermark message, signal or payload can be provided (19), e.g., to a remote database to obtain related metadata or information, to a local processor, for display, to a rights management system, to facilitate an online transaction, etc.

In addition to the Lab color scheme discussed above, a watermark signal may be embedded in color image (or video) data represented by RGB, Yuv, Ycc, CMYK or other color schemes, with, e.g., a watermark signal inserted in a first chrominance direction (e.g., red/green direction, similar to that discussed above for the 'a' channel) and a second chrominance direction (e.g., a blue/yellow direction, similar to that discussed above for the 'b' channel). For watermark signal detection with an alterative color space, e.g., an RGB or CMYK color space, an image can be converted to Lab (or other color space), or appropriate weights of, e.g., RGB or CMY channels, can be used. For example, the following RGB weights may be used to calculate 'a'−'b': Chrominance Difference=0.35*R−1.05*G+0.70*B+128, where R, G and B are 8-bit integers.

Further Considerations of Video

The human contrast sensitivity function curve shape with temporal frequency (e.g., relative to time) has a very similar shape to the contrast sensitivity with spatial frequency.

Successive frames in a video are typically cycled at about at least 60 Hz to avoid objectionable visual flicker. So-called "flicker" is due to the high sensitivity of the human visual system (HVS) to high temporal frequency changes in luminance. The human eye is about ten (10) times less sensitive to high temporal frequency chrominance changes.

Figure 11:
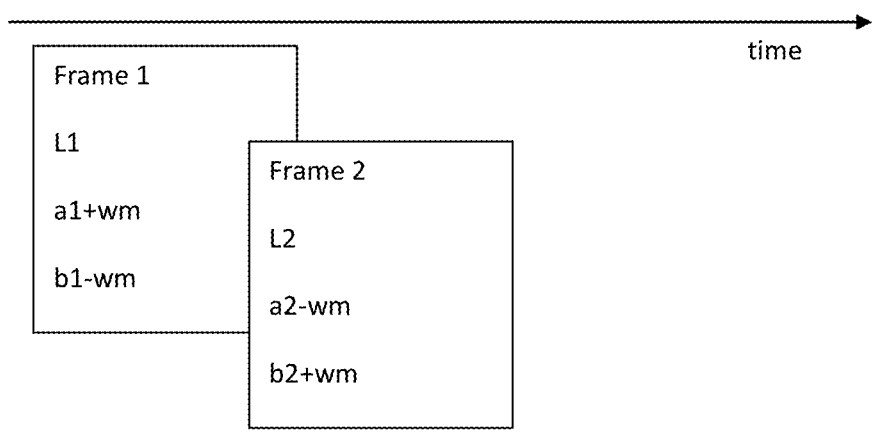
FIG. 11 is a diagram showing watermarks embedded in first and second video frames.

Consider a video sequence with frames as shown in FIG. 11. A chrominance watermark can be added to frame 1 per the above description for images. In a similar way, a watermark is added to frame 2 but the polarity is inverted as shown in FIG. 11.

In order to recover the watermark, pairs of frames are processed by a watermark detector, and the 'a' channels are subtracted from each other as shown below.

$$Det\_a = (a1 + wm) - (a2 - wm) = (a1 - a2) + 2*wm \quad (14)$$

Det_a refers to watermark detection processing of the 'a' channel. Because of the temporal correlation between frames, the image content in equation 14 is reduced while the watermark signal is reinforced.

In a similar way the 'b' channels are also subtracted from each other $$Det\_b = (b1 - wm) - (b2 + wm) = (b1 - b2) - 2*wm \quad (15)$$

Det_a refers to watermark detection processing of the 'b' channel. Equation 14 and 15 are then subtracted from each other as shown below in equation 16.

$$\text{Det\_a} - \text{Det\_b} = (a1 - a2 + 2*wm) - (b1 - b2 - 2*wm) \quad (16)$$
$$= (a1 - a2) - (b1 - b2) + 4*wm$$

In generally, related (but not necessarily immediately adjacent) frames will have spatially correlated content. Because of the spatial correlation between the 'a' and 'b' frames, the image content is reduced while the watermark signal is reinforced. See equation 16.

For any one pair of frames selected by a watermark detector, the polarity of the watermark could be either positive or negative. To allow for this, the watermark detector may examine both polarities.

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, and/or by executing software or instructions with a processor or circuitry. Similarly, watermark data decoding or decoders may be implemented in software, firmware, hardware, combinations of software, firmware and hardware, a programmable computer, electronic processing circuitry, and/or by executing software or instructions with a processor, parallel processors or other multi-processor configurations.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by a processor (or electronic processing circuitry, hardware, digital circuit, etc.).

While one embodiment discusses inverting the polarity in a second color channel (e.g., a 'b' channel), one could also invert the polarity in the first color channel (e.g., an 'a' channel) instead. In such a case, the first color channel is then preferably subtracted from the second color channel.

The particular combinations of elements and features in the above-detailed embodiments are exemplary only; the interchanging and substitution of these teachings with other teachings in this and the incorporated-by-reference patents are also contemplated.

What is claimed is:

1. An apparatus comprising:
memory for storing a color video signal comprising first data and second data;
a processor programmed for:
transforming first color direction information and second color direction information of the first data by encoding a signal in the first color direction information such that the signal includes a first signal polarity, and encoding the signal in the second color direction information such that signal includes a second signal polarity that is inversely related to the first signal polarity, transforming first color direction information and second color direction information of the second data by encoding the signal in the first color direction information such that signal includes the second signal polarity, and encoding the signal in the second color direction information such that the signal includes the first signal polarity.

2. The apparatus of claim 1 in which encoding the signal utilizes digital watermark embedding.

3. The apparatus of claim 1 in which the signal—once encoded in the first data and in the second data—is obscured to a human observer as the color video signal is rendered in real time.

4. The apparatus of claim 1 in which the first data comprises a first video frame and the second data comprise a second video frame.

5. The apparatus of claim 4 in which the first frame and the second frame are not adjacent frames.

6. An apparatus comprising:
memory for storing a color video signal or color image signal comprising first data representing a first chrominance direction and second data representing a second chrominance direction; and
a processor programmed for:
transforming the first data representing the first chrominance direction by encoding a first digital watermark component in the first data, the encoding a first digital watermark component in the first data utilizing a first encoding gain, and
transforming the second data representing the second chrominance direction by encoding a second digital watermark component in the second data, the encoding a digital watermark signal in the second data utilizing a second encoding gain, wherein the second digital watermark component comprises an inverted signal relative to the first digital watermark component.

7. The apparatus of claim 6 in which the first chrominance direction comprises a blue-yellow direction.

8. The apparatus of claim 7 in which the second chrominance direction comprises a red-green direction.

9. The apparatus of claim 6 in which the first encoding gain is different than the second encoding gain.

10. The apparatus of claim 6 in which the first data and the second data collectively represented through variously weighted Red, Green and Blue values.

11. An apparatus comprising:
memory for storing a color video signal or color image signal comprising first data representing a first chrominance direction and second data representing a second chrominance direction;
means for transforming the first data representing the first chrominance direction by encoding a first digital watermark component in the first data, the encoding a first digital watermark component in the first data utilizing a first encoding gain; and
means for transforming the second data representing the second chrominance direction by encoding a second digital watermark component in the second data, the encoding a digital watermark signal in the second data utilizing a second encoding gain, wherein the second digital watermark component comprises an inverted signal relative to the first digital watermark component.

12. The apparatus of claim 11 in which the first chrominance direction comprises a blue-yellow direction.

13. The apparatus of claim 12 in which the second chrominance direction comprises a red-green direction.

14. The apparatus of claim 11 in which the first encoding gain is different than the second encoding gain.

15. The apparatus of claim 11 in which the first data and the second data collectively represented through variously weighted Red, Green and Blue values.

* * * * *